United States Patent
Couturier

(10) Patent No.: US 7,406,045 B2
(45) Date of Patent: Jul. 29, 2008

(54) MODULAR POLICY DECISION POINT FOR PROCESSING RESOURCE-RESERVATION REQUESTS WITHIN A DATA NETWORK

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 945 days.

(21) Appl. No.: 10/117,045

(22) Filed: Apr. 8, 2002

(65) Prior Publication Data

US 2002/0146012 A1 Oct. 10, 2002

(30) Foreign Application Priority Data

Apr. 9, 2001 (FR) .................................. 01 04791

(51) Int. Cl.
*H04L 12/26* (2006.01)
*G06F 15/173* (2006.01)

(52) U.S. Cl. .................. 370/231; 370/395.21; 709/226

(58) Field of Classification Search ........................ None
See application file for complete search history.

(56) References Cited

U.S. PATENT DOCUMENTS

| 5,838,921 | A  | * | 11/1998 | Speeter .................. 709/227 |
| 5,854,789 | A  | * | 12/1998 | Lesch et al. ............... 370/395.2 |
| 6,226,263 | B1 | * | 5/2001  | Iwase et al. ................. 370/231 |
| 6,601,082 | B1 | * | 7/2003  | Durham et al. ............. 718/100 |
| 6,714,515 | B1 | * | 3/2004  | Marchand .................... 370/231 |
| 6,988,133 | B1 | * | 1/2006  | Zavalkovsky et al. ........ 709/223 |
| 2002/0085559 | A1 | * | 7/2002 | Gibson et al. ............... 370/392 |
| 2005/0213584 | A1 | * | 9/2005 | Donovan ............... 370/395.21 |

OTHER PUBLICATIONS

Preuss et al. "Virtual private resources. An approach for long-term binding of services" Enterprise Distributed Object Computing Workshop [1997]. EDOC '97. Proceedings. First International, Oct. 24, 1997, pp. 216-226.*

Preuss et al:: "Virtual Private Resources. An Approach for long-term binding of services" Enterprise Distributed Object Computing workshop Y1997. Proceedings., First International Gold Coast, QLD., Australia Oct. 24-26, 1997, Los Alamitos, CA, USA, IEEE Comput. SOC, US, Oct. 24, 1997, pp. 216-226, XP010251301.

* cited by examiner

*Primary Examiner*—Huy D. Vu
*Assistant Examiner*—Clemence Han
(74) *Attorney, Agent, or Firm*—Sughrue Mion, PLLC

(57) ABSTRACT

A policy decision point for processing resource-reservation requests within a data network. It includes a software bus for communicating with management modules for processing the resource-reservation requests, and transmission of each resource-reservation request to one or more management modules, in application of a set of rules.

16 Claims, 2 Drawing Sheets

MODULAR POLICY DECISION POINT FOR PROCESSING RESOURCE-RESERVATION REQUESTS WITHIN A DATA NETWORK

The present invention relates to managing quality of service over a data network. It applies most particularly to data networks that enable a variety of services to be provided, such as transmitting voice, data, video, etc. By way of example, such a network can be a network based on protocols of the transport control protocol/Internet protocol (TCP/IP) family, i.e. of type commonly referred to as the Internet.

BACKGROUND OF THE INVENTION

Certain services require express reservation of resources within the network.

Certain networks, including the Internet, were designed for transmitting data, but neither voice nor video. Within the Internet, transmission takes place in the form of packets, each packet being conveyed independently of the others. However, voice and video transmission need to minimize jitter, i.e. the mean difference in transit times between any two packets in a given transmission, and also overall transit time, so as to ensure that listening or viewing at the destination are sufficiently comfortable.

This minimizing of jitter and/or transit time is conventionally performed by reserving dedicated resources within the nodes of the network, commonly called "routers".

Nevertheless, it is clear that there is a need to control such reservation of resources. It is necessary to verify that a request for resource reservation is made by an entity having sufficient authorization to make such a request, and in particular an entity that has taken out an appropriate subscription for using the network.

When there are incompatibilities between a plurality of requests to reserve resources, for example because they require the same network element to be reserved at the same instant, this can lead to managing priorities.

To be able to do this, resource-reservation requests must be sent to an authorization manager, commonly referred to as a policy decision point (PDP) which implements this control.

FIG. 1 is a diagram of an example of a network suitable for implementing the invention and showing the context in which such a policy decision point operates.

A user A seeks to set up a voice call with a user B through a data network N. User A is connected to the network N via an access node or "edge router" $R_A$, and user B is connected to the same network N via an access node $R_B$.

The resource-reservation request is conveyed to a policy decision point M. By way of example, this request might come directly from user A via an arrow referenced $R_1$, or from access node $R_A$ via an arrow referenced $R_2$.

If the request comes from the user, it can comply with the session initiation protocol (SIP), for example, in compliance with the Internet engineering task force request for comments (IETF RFC) No. 2543.

If the request comes from the access node $R_A$, it can comply with the common open policy service (COPS) protocol in application of IETF RFC 2748 published in January 2000.

The function of the policy decision point M is then:

to verify that the request can indeed be authorized. This verification can be performed, for example, firstly as a function of the resources that are presently available in the network N, and secondly as a function of the subscription taken out by user A; and where appropriate, to make the resource reservations corresponding to the request with each of the nodes concerned within the network N.

Consequently, in that mechanism, any resource-reservation request terminates in the policy decision point M.

This gives rise to various problems:

the policy decision point needs to handle resource-reservation requests of different kinds (video, voice, . . . ) and of different characteristics (low/high data rates, . . . ). It therefore needs to contain all of the logic necessary for processing such requests, and in practice this is not possible given the rapid evolution in the types of service that are available in this kind of network; and when there is a change in the policy decision point (delivery of a new version), any personalization or parameterization that might be requested by the operator running the policy decision point cannot be taken into account.

OBJECT AND SUMMARY OF THE INVENTION

The object of the invention is to propose an architecture for a policy decision point that enables it to be updated easily and to be modular.

For this purpose, the invention provides a policy decision point for processing resource-reservation requests within a data network. The policy decision point comprises:

means for communicating with management modules to process resource-reservation requests; and means for transmitting each resource-reservation request to one or more management modules in application of a set of rules.

In an implementation of the invention, a portion of said set of rules can be transmitted by the management modules themselves, particularly during a stage of registering such management modules with the policy decision point.

The invention also provides an access node to a data network including such a policy decision point.

It is thus possible to add new management modules, possibly on a dynamic basis.

It is also possible to conserve indefinitely any old management modules that have been personalized for or by the operator, while not impeding overall evolution of the policy decision point.

A management module is typically constituted by software code, but it could also be implemented as a complete system comprising a data processor system together with software code that is executed thereon.

BRIEF DESCRIPTION OF THE DRAWINGS

The invention and its advantages appear more clearly in the following description of an implementation given with reference to the accompanying figures.

MORE DETAILED DESCRIPTION

Figure 1:
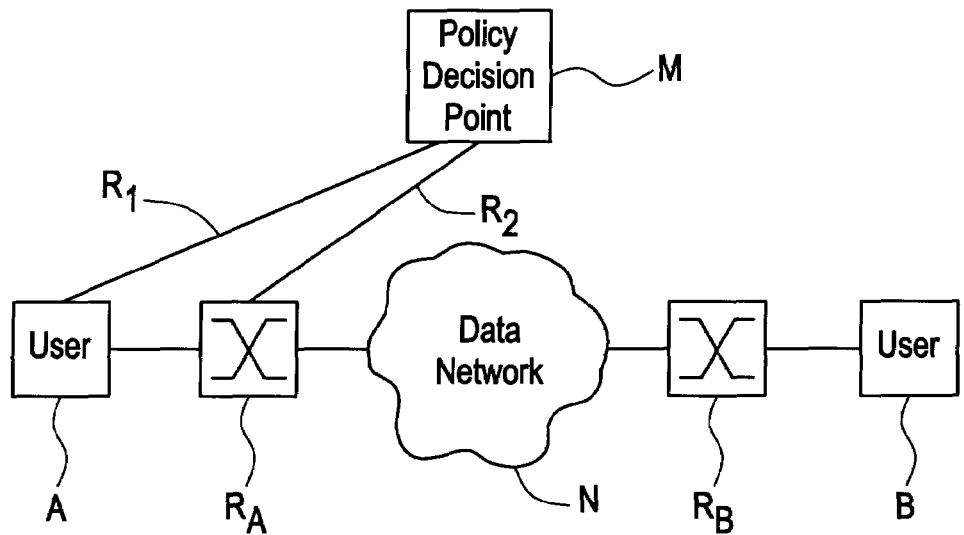
FIG. 1, commented on above, shows the context in which the policy decision point of the invention operates.
Figure 2:
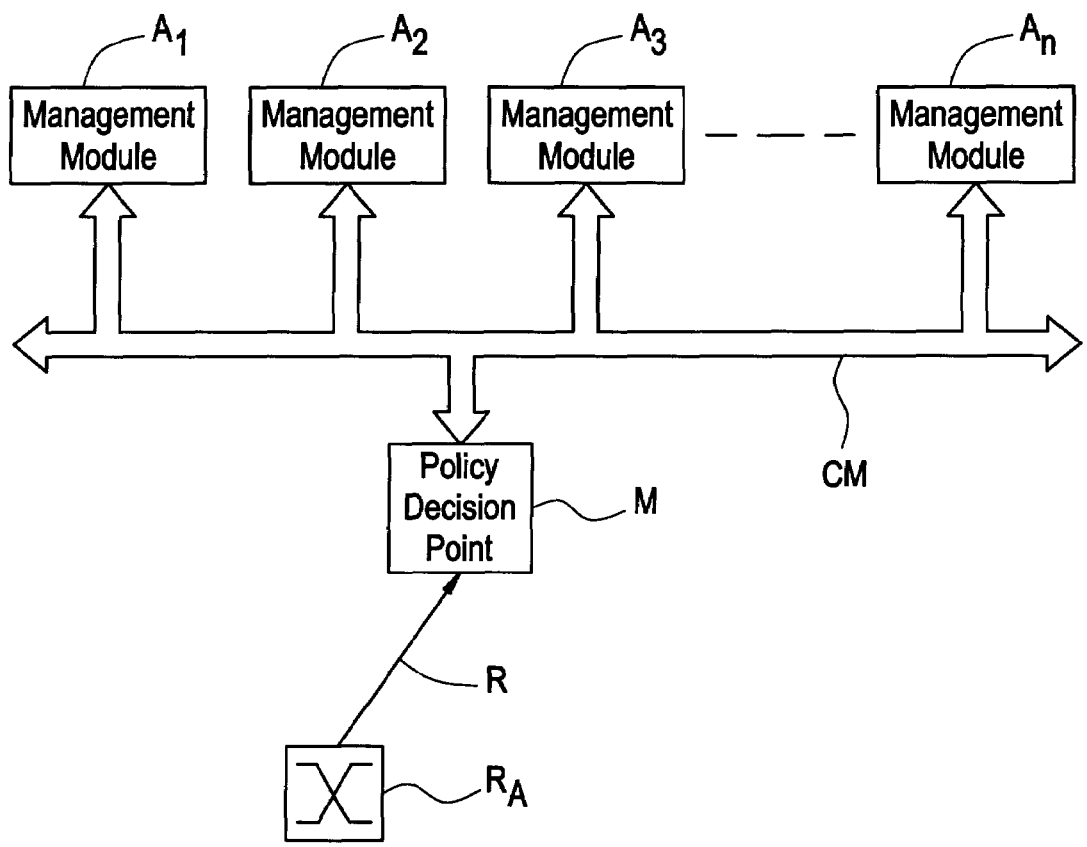
FIG. 2 is a diagram of an implementation of such a policy decision point.

In its implementation shown in FIG. 2, the policy decision point M receives resource-reservation requests R coming from an access node $R_A$. These resource-reservation requests can comply with the above-mentioned COPS protocol, for example.

Nevertheless, the mechanism described will be similar even if the request comes from users making the resource-reservation request and/or is in compliance with some other protocol (in particular SIP). Another possibility, described below, is to integrate the policy decision point in the access node itself.

The policy decision point M has means for communicating with a set of management modules $A_1, A_2, A_3, \ldots, A_n$ (which set could in the limit be reduced to a singleton).

Resource-reservation requests are received by the policy decision point M whose function is then:
 to analyze the content of the resource-reservation requests; and
 to determine which management module is to process the request, and then to transmit the request to that module.

It is possible for a resource-reservation request to be duplicated, and forwarded by the policy decision point to a plurality of management modules. The rules used by the policy decision point for determining where to send a request can be such that a plurality of management modules are competent for processing a given resource-reservation request.

It is also possible that a resource-reservation request is itself modified by the policy decision point before being transmitted to one or more management modules.

One example of such a modification is to simplify resource-reservation requests so as to simplify the development of management modules.

The resource-reservation request as received by the policy decision point, e.g. in compliance with the COPS protocol, describes the quality of service that is being requested (jitter, transit time, data rate, . . . ) in great detail. For forwarding to one or more management modules, it can be simplified, and the resource-reservation request can be presented on a scale that is easier for the developers of management modules to understand. By way of example, the scale of service could be of one of the following types: platinum; gold; silver; bronze; or normal service; or else: interactive, hi-fi audio, normal audio, normal video, hi-fi video, etc.

When a request is transmitted for processing to a plurality of management modules, this transmission may possibly take place in parallel, particularly when the results from one module are not necessary for processing by another.

Another possibility is to process the request sequentially in the management modules concerned. In other words, in this implementation, the policy decision point waits for a reply from one management module before possibly transmitting the resource-reservation request to another management module.

The rules used by the policy decision point for determining the management module(s) to which it is going to transmit the resource-reservation requests can be fixed in advance, modified in operation, or indeed specified by the management modules themselves.

As mentioned above, provision can be made for the management modules to register themselves with the policy decision point M while it is in operation. Under such circumstances, when a new management module is being registered with the policy decision point M, the new module can specify a set of rules for use by the policy decision point M when determining which resource-reservation request to transmit to that module.

These rules might be as follows:

Specifying the kind of traffic concerned.
 A management module might be suitable for processing only a Certain type of traffic: video, voice, etc. As mentioned above, this type of traffic can imply special modes of processing by network elements and thus specific resource-reservation policies (e.g. minimizing jitter).

Specifying one or more quality of service characteristics.
 A management module can be designed more particularly for processing resource-reservation requests corresponding to particular quality of service characteristics (data rate, etc.), and the particular resource-reservation problems associated therewith.

Specifying a response time for the management module.
 Some management modules can be structured so that their response times (i.e. the time between receiving a resource-reservation request and actually making the reservation, where appropriate) are guaranteed to be below a threshold, or else to present mean performance having a certain value, etc. Under such circumstances, the management modules can specify such thresholds or mean values to the policy decision point M.

Specifying a topological region.
 Another example is for the management modules to specify a topological region of the network that they are capable of processing. By way of example, this topological region might be a domain of a telecommunications network, or a set of network elements defined by belonging to the same geographical region.

Specifying an identifier for the management module.
 Resource-reservation requests can contain an identifier (known as a "token") for the management module to be used. This can be advantageous, for example, when there is a need to find correlation between a plurality of requests (e.g. a request complying with the COPS protocol and a request complying with the SIP protocol), and it is important for both of these requests to be processed by the same management module.

In addition to the above rules, the policy decision point can have a priority or ordering mechanism enabling it to select which management module(s) is to receive each resource-reservation request.

For example, it may have an order of invocation. As mentioned above, for a given resource-reservation request, there may exist a plurality of management modules capable of processing it. Such an order of invocation then makes it possible to establish priorities between the various management modules and to select the management module that is to be the first to receive the resource-reservation request.

The management modules $A_1, A_2, A_3 \ldots, A_n$ are capable of processing the resource-reservation requests that are transmitted to them, and therefore that correspond to the rules which correspond to them.

The exact manner in which a management module decides whether or not to accept a resource-reservation request does not form part of the invention, and it can comply with any resource management system known in the state of the art.

By way of example, mention can be made of the case in which management modules establish correlation between a resource-reservation request (typically complying with the COPS protocol) and a request to reserve a voice channel, e.g. in compliance with the SIP protocol, so as to verify that that which was described in the first request is indeed also described in the second request.

Management modules that have received a resource-reservation request can decide whether to authorize it or to forbid it, or indeed they can decide not to make a decision (which, in the final analysis, amounts to the management module in question not being genuinely competent for making a decision about the particular resource-reservation request).

The policy decision point M then optionally has the task of federating the replies from the management modules when the same resource-reservation request has been transmitted to a plurality of management modules. Typically, the policy decision point will wait merely until it has one (and only one) response authorizing the request, prior to transmitting an authorization response to the access node $R_A$.

In FIG. 2, reference CM represents communications means used for enabling communication to take place between the policy decision point M and the various management modules $A_1, A_2, A_3, \ldots, A_n$.

By way of example, the communications means can be a software bus such as the common object request broker architecture (CORBA) or the open management group (OMG) or the component object model (COM) from Microsoft.

The use of such a software bus makes it possible, amongst other things, to add new management modules while the system is in operation, as mentioned above.

Other implementations are possible, and in particular it is possible to use a protocol based on COPS to enable management modules and a policy decision point to communicate with one another.

Figure 3:
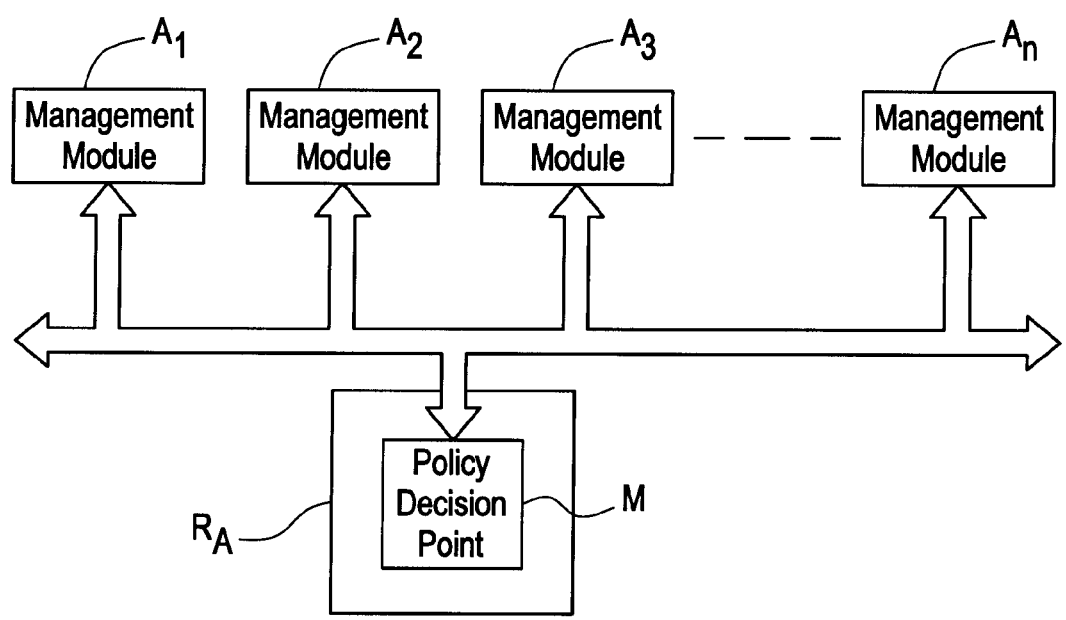
FIG. 3 shows an alternative implementation of the policy decision point of the invention.

FIG. 3 shows an alternative implementation of the invention.

In this implementation, the policy decision point M is included in the access node $R_A$ itself. It then has means for communicating with the management modules $A_1, A_2, A_3, \ldots, A_n$ which can then be implemented in other information processing systems or possibly likewise in the same access node $R_A$.

The invention claimed is:

1. A policy decision point for processing resource-reservation requests within a data network, the decision point comprises means for communicating with management modules for processing said resource-reservation requests, and means for transmitting each resource-reservation request to one or more management modules, in application of a set of rules, wherein said rules comprise (a) specifying a kind of traffic, (b) specifying a quality of service characteristic, (c) specifying a response time for at least one of said management modules, (d) specifying a topological region, and (e) specifying an identifier for the at least one of said management modules.

2. A policy decision point according to claim 1, in which the management modules are designed to transmit respective portions of the rules in said set of rules to the policy decision point, said portions relating to the modules concerned.

3. A policy decision point according to claim 2, wherein a new management module is registered while said policy decision point is in operation, and in which, during such registration, said new management module transmits said portion of the set of rules relating thereto to said policy decision point.

4. A policy decision point according to claim 1, wherein a new management module is registered while said policy decision point is in operation.

5. A policy decision point according to claim 1, in which said communications means comprise a software bus.

6. The policy decision point of claim 5, wherein said software bus comprises one of a common object request broker architecture (CORBA), an open management group (OMG), and a component object model (COM).

7. A policy decision point according to claim 1, in which the means for transmitting resource-reservation requests are suitable for modifying said resource-reservation requests by simplifying said resource-reservation requests.

8. A data network access node, including a policy decision point according to claim 1.

9. A policy decision point for processing resource-reservation requests within a data network, the policy decision point comprising:
   a software bus configured to communicate with management modules so as to process said resource-reservation requests,
   said policy decision point configured to transmit each resource-reservation request to one or more management modules, in application of a set of rules to determine where to send said resource-reservation requests, wherein said rules comprise specifying a kind of traffic, specifying a quality of service characteristic, specifying a response time for at least one of said management modules, specifying a topological region, and specifying an identifier for the at least one of said management modules.

10. The policy decision point of claim 9, wherein the management modules transmit respective portions of the rules to the policy decision point, said portions relating to the modules concerned.

11. The policy decision point of claim 10, wherein a new management module is registered while said policy decision point is in operation, and in which, during such registration, said new management module transmits said portion of the set of rules relating thereto to said policy decision point.

12. The policy decision point of claim 9, wherein a new management module is registered while said policy decision point is in operation, and specifies said rules when determining which of said resource-reservation requests to transmit.

13. The policy decision point of claim 9, wherein the resource-reservation requests are modified by simplifying said resource-reservation requests.

14. The policy decision point of claim 9, wherein transmission to said management modules occurs in parallel.

15. The policy decision point of claim 9, wherein transmission to said management modules occurs sequentially.

16. The policy decision point of claim 9, wherein said rules are fixed in advance, modified during operation, or specified by said management modules.

* * * * *